(12) United States Patent
Piszczek

(10) Patent No.: US 12,341,200 B2
(45) Date of Patent: Jun. 24, 2025

(54) METHOD FOR PRODUCING A CATALYST-COATED MEMBRANE

(71) Applicant: AUDI AG, Ingolstadt (DE)

(72) Inventor: Pascal Piszczek, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 195 days.

(21) Appl. No.: 18/001,852

(22) PCT Filed: Sep. 13, 2021

(86) PCT No.: PCT/EP2021/075034
§ 371 (c)(1),
(2) Date: Dec. 14, 2022

(87) PCT Pub. No.: WO2022/058260
PCT Pub. Date: Mar. 24, 2022

(65) Prior Publication Data
US 2023/0238543 A1    Jul. 27, 2023

(30) Foreign Application Priority Data

Sep. 17, 2020    (DE) ............ 10 2020 124 217.4

(51) Int. Cl.
*H01M 4/88* (2006.01)
*H01M 4/86* (2006.01)
(Continued)

(52) U.S. Cl.
CPC ......... *H01M 4/881* (2013.01); *H01M 4/8642* (2013.01); *H01M 4/8647* (2013.01);
(Continued)

(58) Field of Classification Search
CPC ............. H01M 4/8642; H01M 4/8647; H01M 4/8663; H01M 4/881; H01M 4/8828;
(Continued)

(56) References Cited

U.S. PATENT DOCUMENTS

2002/0068213 A1    6/2002  Kaiser et al.
2004/0086632 A1    5/2004  Vlajnic et al.
(Continued)

FOREIGN PATENT DOCUMENTS

DE    102017123939 A1    4/2018
DE    102010054274 B4    1/2019
(Continued)

OTHER PUBLICATIONS

Litster et al., "PEM fuel cell electrodes," Journal of Power Sources 130(1-2):61-76, May 3, 2004. (16 pages).
(Continued)

*Primary Examiner* — Victoria H Lynch
(74) *Attorney, Agent, or Firm* — Seed IP Law Group LLP

(57) ABSTRACT

A method for producing a catalyst-coated membrane includes: producing and/or providing at least one first ink with a first ink composition, comprising supported catalyst particles, a proton-conductive ionomer, and a dispersing agent, the content of the supported catalyst particles in the composition remaining below the content of the proton-conductive ionomer; unwinding a web-shaped proton-conductive membrane material which is provided on a roll; applying at least one layer of the first ink onto at least one section of the membrane material using a first application tool; and sputtering a catalyst powder consisting of or comprising catalyst particles onto a surface of the outermost ink layer facing away from the membrane material using a sputtering device.

10 Claims, 3 Drawing Sheets

(51) Int. Cl.
*H01M 4/90* (2006.01)
*H01M 8/1004* (2016.01)
*H01M 8/1018* (2016.01)

(52) U.S. Cl.
CPC ......... *H01M 4/8828* (2013.01); *H01M 4/886* (2013.01); *H01M 4/9058* (2013.01); *H01M 4/9083* (2013.01); *H01M 8/1004* (2013.01); *H01M 8/1018* (2013.01)

(58) Field of Classification Search
CPC .... H01M 4/886; H01M 4/905; H01M 4/9083; H01M 4/926; H01M 4/928; H01M 8/1004; H01M 8/1018; Y02E 60/50; Y02P 70/50
See application file for complete search history.

(56) References Cited

U.S. PATENT DOCUMENTS

| | | |
|---|---|---|
| 2008/0206616 A1 | 8/2008 | Atanassova et al. |
| 2009/0239116 A1 | 9/2009 | Okumura et al. |
| 2010/0221639 A1 | 9/2010 | Oota |
| 2018/0261852 A1 | 9/2018 | Gumeci et al. |
| 2019/0245215 A1 | 8/2019 | Sousa et al. |

FOREIGN PATENT DOCUMENTS

| | | | |
|---|---|---|---|
| EP | 1624514 B1 | 4/2013 | |
| KR | 20080008855 A | 1/2008 | |
| KR | 20200002144 A | 1/2020 | |
| WO | WO-9916137 A1 * | 4/1999 | ............ C23C 14/06 |
| WO | WO 0243171 A2 | 5/2002 | |
| WO | WO-2005008814 A2 * | 1/2005 | ........... H01M 4/921 |
| WO | WO 2008106504 A2 | 9/2008 | |
| WO | WO 2016149168 A1 | 9/2016 | |

OTHER PUBLICATIONS

Written Opinion of the International Searching Authority, mailed Dec. 3, 2021, for International Patent Application No. PCT/EP2021/075034. (6 pages).

* cited by examiner

METHOD FOR PRODUCING A CATALYST-COATED MEMBRANE

BACKGROUND

Technical Field

Embodiments of the invention relate to a method for producing a catalyst-coated membrane (CCM).

Description of the Related Art

Fuel cell devices are used for the chemical conversion of a fuel, using oxygen, to water so as to generate electrical energy. For this purpose, fuel cells comprise, as a core component, a proton-conductive (electrolyte) membrane, to which electrodes are assigned. During operation of the fuel cell device comprising a plurality of fuel cells combined to form a fuel cell stack, the fuel, in particular hydrogen ($H_2$) or a hydrogen-containing gas mixture is supplied to the anode. In the case of a hydrogen-containing mixture, this mixture is initially reformed and hydrogen is provided in this way. At the anode, electrochemical oxidation of $H_2$ to $H^+$ takes place, giving off electrons. The electrons provided at the anode are conducted to the cathode via an electrical line. The cathode is supplied oxygen or an oxygen-containing gas mixture, so that a reduction of $O_2$ to $O^{2-}$ takes place, taking up the electrons.

Documents WO 2008 106 504 A2, WO 2016 149 168 A1 and WO 2002 043 171 A2 describe the industrial manufacture of catalyst-coated membranes, wherein the membrane is provided in web-shaped form so as to be coated thereafter with electrode material. In particular WO 2008 106 504 A2 describes coating the membrane material from a roll to a roll, wherein different ink compositions are used for coating the substrate.

During operation of the fuel cell, it has been found that the greatest moisture or liquid formation arises especially on the cathode side of the membrane electrode assembly, so that efficient water management is necessary, using a suitable composition of the catalyst layer.

BRIEF SUMMARY

Some embodiments provide a method for producing a catalyst-coated membrane in such a way that an improved particle distribution of the catalyst particles, and with this, improved efficiency and improved water management of the fuel cell are provided.

Some embodiments include the following steps:
producing and/or providing a first ink having a first ink composition, comprising supported catalyst particles, a proton-conductive ionomer and a dispersing agent, the content of the supported catalyst particles in the composition being lower than the content of the proton-conductive ionomer;
unrolling a web-shaped proton-conductive membrane material, which is provided on a roll;
applying at least one layer of the first ink onto at least one section of the membrane material using a first application tool; and
sputtering a catalyst powder consisting of or comprising catalyst particles onto a surface of the outermost ink layer which away from the membrane material using a sputtering device.

This method is characterized in that a multi-stage process using differing densities of catalyst loadings is used, wherein the layer that is in direct contact with the membrane has a larger content of the ionomer, and thus a lower content of catalyst particles, than the layer at the edge of the electrode of the catalyst-coated membrane. The terminating, in particular porous and therefore only partially closed, layer made of catalyst particles on the outermost ink layer causes the largest amount of catalyst to be present at the location of the CCM situated the furthest from the proton-conductive (core) membrane, thereby additionally favoring the fuel cell reaction. An increased catalyst density is thus especially present at the transition from the electrode to the adjoining gas diffusion layer. This reflects the essential advantage of an accelerated reactivity at the outer layer of the particular electrode, since in this way a larger number of particles, and thus a larger content of catalysts, is present for the fuel cell reaction. This is in particular of advantage since a plurality of such membrane electrode assemblies are required for use, for example in motor vehicles, in order to provide the desired power. As a result of the, only incremental, increase in catalyst density that can be achieved by way of the method described herein, which increases as the distance from the membrane increases, it is possible to reduce the usually very expensive catalyst material. Moreover, ink compositions close to the membrane can be designed so as to have a lower content of ingredients that are damaging to the adjoining membrane than ink compositions situated further away.

This provides the option that at least one second ink is produced and/or provided, which comprises the supported catalyst particles, the proton-conductive ionomer and the dispersing agent, wherein the content of the proton-conductive ionomer is lower than the content of the supported catalyst particles. In this case, at least one layer of the second ink is then applied onto an outermost layer of the first ink before the catalyst powder is sputtered on. In this way, it is likewise possible to achieve an incremental increase in the density of catalyst particles.

It shall be pointed out that it is also possible to use a plurality of three or more inks, and the embodiments described herein are consequently not limited to two inks and two ink compositions. The sputtering with catalyst powder may take place after the outermost ink layer has been applied. In principle, however, the option of sputtering on intermediate layers made of catalyst powder also available.

To apply the cathode and the anode to the membrane at the same time, the first ink may be applied to both sides of the membrane material using the first application tool, when chronologically thereafter in particular the second ink is applied to both sides of the respective outermost layer of the first ink, which is applied onto the membrane material, using the second application tool, and when chronologically after the application of the second ink the catalyst particle power is sputtered on both sides of the respective outermost ink layer.

The option exists of transporting the membrane material that has been coated with the first ink to an intermediate drying unit, in which the first ink is dried before the second ink is applied. In this way, blending of the individual ink coatings can be avoided, so that a defined, in particular incrementally increasing, distribution of the catalyst particles in each ink coating is present, up to the edge of the electrode.

The catalyst powder may be sputtered on the outermost ink layer while the same is still in a moist or wet state. In this way, the individual catalyst particles can partially penetrate into the outermost layer during sputtering, thereby being reliably bound in the composite of the final catalyst-coated membrane (CCM).

It is also useful when the catalyst particles are sputtered on the outermost ink layer while the same is only present in a partially dried state, since in this way it can be ensured, due to the viscosity of the outermost ink layer being enhanced by virtue of partial drying, that the sputtered-on catalyst particles do not penetrate too deep into the outermost ink layer.

The sputtered-on catalyst powder can, in turn, be composed of supported, in particular carbon-supported, catalyst particles. However, the option of using unsupported catalyst particles for the catalyst sputtering also exists.

The manufacturing process can be expedited in that the intermediate drying unit is only configured to only partially dry the first ink so that merely a dry edge film made of first ink results, onto which the second ink is applied. In this way, the process time is shortened since only a portion of the first ink is dried, onto which the second ink can be applied, without blending of the two inks occurring.

A layer thickness measurement of the layer of the first ink may be carried out after the first ink has been applied. This layer thickness measurement can, for example, take place in a dry state or in a wet state. Based on the information about the layer thickness of the first ink on the membrane material, it is possible to control different parameters that influence the later electrochemical reaction. For example, if the first ink has been applied too thick, it can be initiated that less first ink is applied onto subsequent sections of the membrane material so as to reduce the layer thickness of subsequent material membrane sections with first ink. In this way, it is thus possible that the first ink is applied onto subsequent sections of the membrane material as a function of the measured layer thickness of preceding sections of the membrane material.

Overall, however, it is also possible for a final (limiting) electrode thickness to be predefined so that it has proven to be advantageous when the second ink to be applied thereafter and/or the catalyst powder sputtered on thereafter are applied as a function of the measured layer thickness of the first ink so as to limit an electrode thickness.

It is also possible to carry out a layer thickness measurement of the electrode thickness after the catalyst powder has been sputtered on, and to apply the first ink and/or the second ink and/or the catalyst powder onto subsequent sections of the membrane material as a function of the measured electrode thickness. It is also possible in this way to adhere to a predefined limiting electrode thickness.

So as to be able to handle the membrane material better, and optionally be able to roll it up, it has proven to be advantageous when the membrane material that has been coated with the at least one ink and sputtered with catalyst powder is transported to a drying unit, in which the coating is completely dried.

A catalyst particle loading of the membrane material, which has been coated with the at least one ink and which has been sputtered with the catalyst powder, may be determined by way of X-ray fluorescence analysis, and when the content of catalyst particles in the inks is adjusted as a function of the measured catalyst particle loading. In this way, it is possible to respond at an early stage to there being an excess or a residue of the catalyst particles in the inks or the sputtered-on catalyst particle powder layer, whereby the content of waste, that is, of poorly produced catalyst-coated membranes, can be lowered.

For the later use in a fuel cell stack, it has proven to be useful when the membrane material, which has been coated with the at least one ink and which has been sputtered with catalyst powder, is cut into individual catalyst-coated membranes (CCM).

The features and feature combinations provided above in the description, and the features and feature combinations provided hereafter in the description of the figures and/or shown only in the figures, can be used not only in the respective indicated combination, but also in other combinations, or alone. As a result, embodiments that are not explicitly shown or described in the figures, but that, as a result of separate feature combinations, can be derived from and implemented based on the provided description, shall also be considered to be encompassed and disclosed by the present disclosure.

BRIEF DESCRIPTION OF THE SEVERAL VIEWS OF THE DRAWINGS

Further advantages, features and details will be apparent from the claims, the following description of embodiments and based on the drawings.

DETAILED DESCRIPTION

Figure 1:
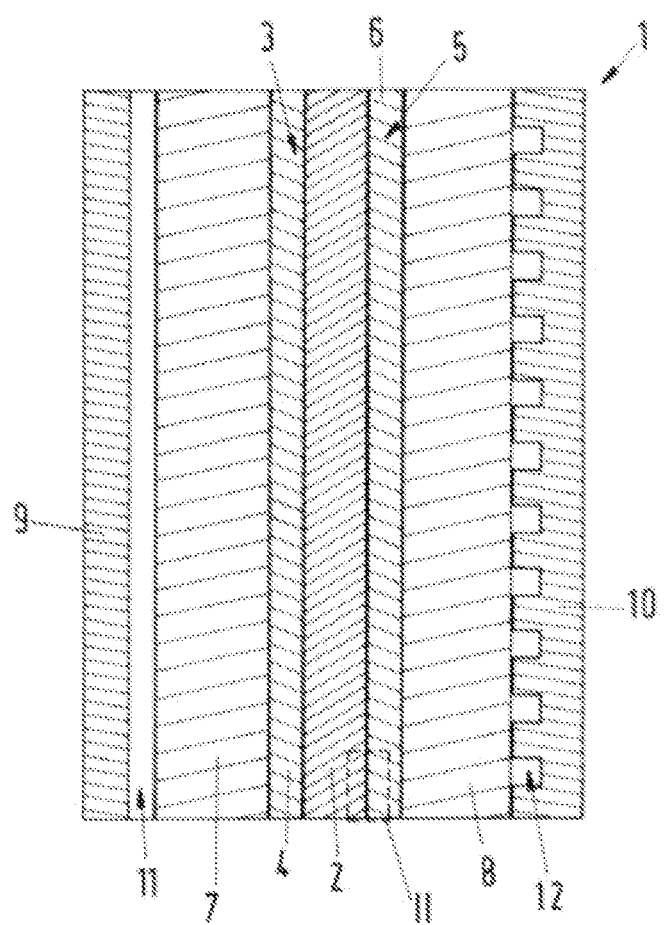
FIG. 1 shows a schematic illustration of the design of a fuel cell.

FIG. 1 shows a fuel cell 1. A semipermeable electrolyte membrane 2 is covered on a first side 3 with a first electrode 4, in the present example the anode, and on a second side 5 with a second electrode 6, in the present example the cathode. The first electrode 4 and the second electrode 6 comprise carrier particles 14, on which catalyst particles 13 made of noble metals or mixtures comprising noble metals such as platinum, palladium, ruthenium or the like are situated or supported. These catalyst particles 13 serve as reaction accelerators during the electrochemical reaction of the fuel cell 1. The carrier particles 14 can contain carbon. However, it is also possible to use carrier particles 14 that are made of a metal oxide or carbon including an appropriate coating. In such a polymer electrolyte membrane (PEM) fuel cell, fuel or fuel molecules, in particular hydrogen, is or are split into protons and electrons at the first electrode 5 (anode). The electrolyte membrane 2 allows the protons (such as $H^+$) to pass, but is impermeable to the electrons ($e^-$). In this embodiment, the electrolyte membrane 2 is formed of an ionomer, such as a sulfonated tetrafluoroethylene (PTFE) polymer or a polymer of perfluorosulfonic acid (PFSA). The following reaction takes place at the anode: $2H_2 \rightarrow 4H^+ + 4e^-$ (oxidation/electron loss).

While the protons pass through the electrolyte membrane 2 to the second electrode 6 (cathode), the electrons are conducted via an external circuit to the cathode or to an energy store. A cathode gas, in particular oxygen or oxygen-containing air, is provided at the cathode, so that the following reaction takes place here: $O_2 + 4H^+ + 4e^- \rightarrow 2H_2O$ (reduction/electron gain).

In the present example, a gas diffusion layer 7, 8 is assigned in each case to the electrodes 4, 6, of which the one gas diffusion layer 7 is assigned to the anode, and the other gas diffusion layer 8 is assigned to the cathode. Moreover, a flow field plate configured as a bipolar plate 9, which has a fuel flow field 11, is assigned to the anode-side gas diffusion layer 7 for supplying the fuel gas. Using the fuel flow field 11, the fuel is supplied to the electrode 4 through the gas diffusion layer 7. On the cathode-side, a flow field plate that comprises a cathode gas flow field 12 and is likewise configured as a bipolar plate 10 is assigned to the gas diffusion layer 8 for supplying the cathode gas to the electrode 6.

In the present example, the electrodes 4, 6 are formed with a multitude of catalyst particles 13, which can be formed as nanoparticles, for example as core shell nanoparticles. These have the advantage of having a large surface, wherein the noble metal or the noble metal alloy is only situated at the surface, while another metal, for example nickel or copper, forms the core of the nanoparticle.

Figure 2:
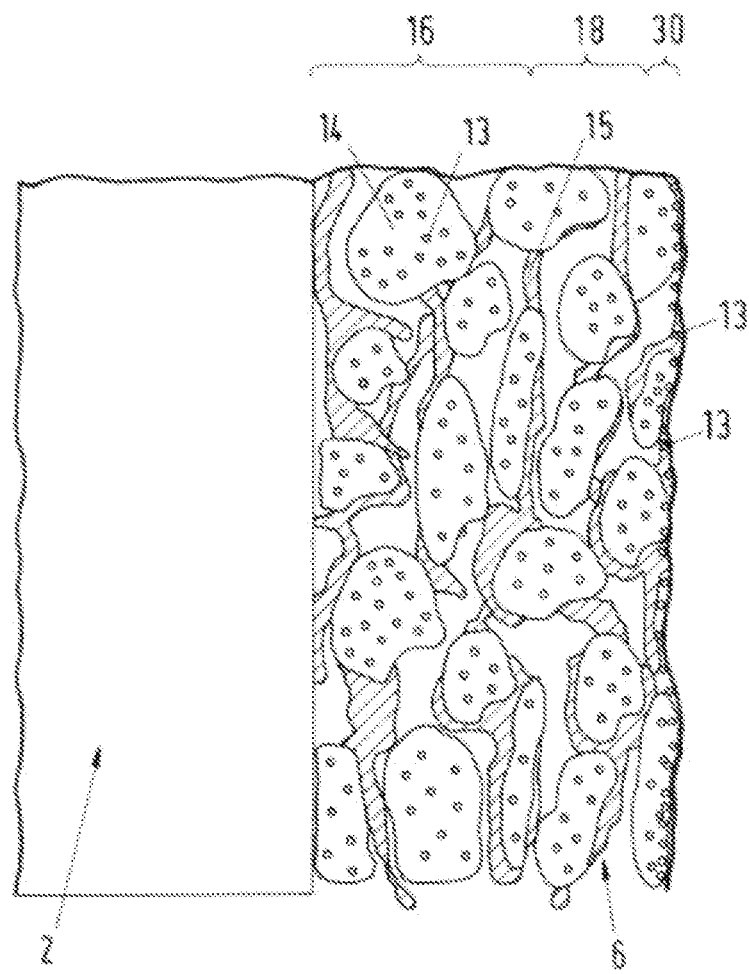
FIG. 2 shows only a schematically represented detailed view II of an electrode from FIG. 1.

The catalyst particles 13 are situated or supported on a multitude of electrically conductive carrier particles 14. Moreover, an ionomer binder 15 is present between the carrier particles 14 and/or the catalyst particles 13, which may be formed of the same material as the membrane 2. This ionomer binder 15 may be formed as a polymer or ionomer containing perfluorosulfonic acid. In the present example, the ionomer binder 15 is present in a porous form, having a porosity of greater than 30 percent. This ensures, in particular on the cathode side, that the oxygen diffusion resistance is not increased, and thereby lower loading of the catalyst particle 13 with noble metal or lower loading of the carrier particles 14 with catalyst particles 13 is made possible (FIG. 2).

Hereafter, a method for producing a catalyst-coated membrane (CCM) is described. Initially, a first ink 16 is produced and/or provided, which has a first ink composition comprising supported catalyst particles 13, a proton-conductive ionomer 15 and a dispersing agent. The ionomer 15 may be formed of the same material as the membrane 2. Isopropanol or acetone, for example, are possible dispersing agents. In this first ink 16, the content of the supported catalyst particles is lower than the content of the proton-conductive ionomer 15. Furthermore, a second ink 18 is produced and/or provided, which has an ink composition comprising the supported catalyst particles 13, the proton-conductive ionomer 15 and the dispersing agent. In this second ink 18, the content of the proton-conductive ionomer 15 is lower than the content of the supported catalyst particles 13. "Being lower than" may be understood to mean a difference of at least 10 percent, of at least 30 percent, or of at least 50 percent in the contents. Finally, a catalyst powder coating 30 made of supported catalyst particles 13 is sputtered on the outermost ink layer, which represents the terminating edge of the particular electrode 4, 6, which abuts the respective adjoining gas diffusion layer 7, 8.

Figure 3:
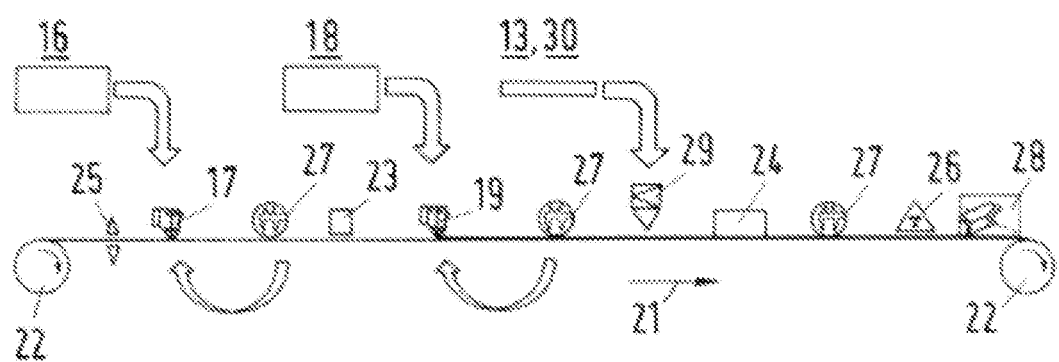
FIG. 3 shows a schematic illustration of a device for producing a catalyst-coated membrane in a side view.

According to FIG. 3, a web-shaped proton-conductive membrane material that is provided on a roll 22 is unrolled and initially guided in a transport direction 21 to a foil cleaning unit 25, in which the membrane material 20 is cleaned so as to be free of dust and deposits. Thereafter, the membrane material 20 is transported further in the transport direction 21 to a first application tool 17, which is used to apply the first ink 16 onto at least one section, such as entirely onto the membrane material 20. A layer thickness measurement of the layer of the first ink 16 is carried out by way of a layer thickness measuring device 27 downstream from the first application tool 17 in the transport direction 21. Downstream from the first application tool 17 in the transport direction 21, an intermediate drying unit 23 is provided so as to dry the first ink 16 before a further ink is printed thereon. The intermediate drying unit 23 shown in the present example is designed to only partially dry the first ink 16, so as to form a dry edge film made of first ink 16 there, before the second ink 18 is applied onto an outermost layer of the first ink 16, which is applied onto the membrane material 20, using a second application tool 19 downstream in the transport direction 21. Downstream from the second application tool 19 in the transport direction 21, another layer thickness measuring device 27 is present so as to measure the coating formed of first ink 16 and second ink 18. This layer thickness measuring device 27 can be used to measure the present wet film thickness. A sputtering device 29 is present downstream from the second application tool 19 in the transport direction 21, by way of which a powder consisting of or comprising catalyst particles 13 is sputtered on a surface of the outermost ink layer which faces away from the membrane material 20. This catalyst powder can be sputtered on the outermost ink layer while the same is still in the moist or wet state, thereby partially penetrating into the outermost ink layer and thus completing the electrode 4, 6. In this way, a density of the catalyst particles 13 which incrementally increases with the distance from the membrane 2 is present. A drying unit 24 follows downstream from the sputtering device 29 in the transport direction 21, which is designed to completely dry the membrane material 20 that has been coated with the inks 16, 18 and which has been sputtered with the catalyst powder. A further layer thickness measuring device 27 is connected downstream from the drying unit 24, following in the transport direction 21, which can measure the dried electrode film, for example using an optical layer thickness measuring head. Additionally, an X-ray fluorescence analysis unit 26 is present, which determines the catalyst particle loading of the membrane material 20 that has been coated with inks 16, 18 and which has been sputtered with the catalyst powder, wherein the content of supported catalyst particles 13 in the inks 16, 18 and the catalyst powder coating 30 can then be adjusted as a function of the measured catalyst particle loading. Before the coated membrane material 20 is rolled up on the further roll 22 again, it is passed by a unit for error marking 28, by way of which potentially present holes in the electrode layers or the like can be marked, so that these, when subsequently cutting the membrane material 20 to size into individual catalyst-coated membranes (CCM), are precluded from comprising a defective coating.

Ultimately, it is possible by way of the method described herein to produce membrane electrode assemblies that are coated with catalyst pastes or inks 16, 18 on an industrial scale, so as to be able to provide these in large quantities. The catalyst-coated membrane produced as described herein is less expensive to produce due to the incremental changes in density of catalyst particles 13. As a result of this incremental increase with increasing distance from the proton-conducting membrane 2, it is additionally possible to achieve an efficiency increase in the fuel cell reaction. The method results in a reduction of the cycle time during the production of individual fuel cells.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing a catalyst-coated membrane, comprising:
    producing and/or providing at least one first ink having a first ink composition, comprising supported catalyst particles, a proton-conductive ionomer and a dispersing agent, the content of the supported catalyst particles in the composition being lower than the content of the proton-conductive ionomer;

unrolling a web-shaped proton-conductive membrane material, which is provided on a roll;

applying at least one layer of the first ink onto at least one section of the proton-conductive membrane material using a first application tool; and sputtering a catalyst powder consisting of or comprising catalyst particles on a surface of an outermost ink layer which faces away from the proton-conductive membrane material using a sputtering device such that a density of the catalyst particles at the surface of the outermost ink layer is increased relative to a density of the catalyst particles of a remainder of the outermost ink layer.

2. The method according to claim 1, wherein at least one second ink is produced and/or provided, comprising the supported catalyst particles, the proton-conductive ionomer and the dispersing agent, in which the content of the proton-conductive ionomer is lower than the content of the supported catalyst particles, and that at least one layer of the second ink is applied onto an outermost layer of the first ink before the catalyst powder is sputtered on.

3. The method according to claim 2, wherein the first ink is applied onto both sides of the proton-conductive membrane material using the first application tool, wherein chronologically thereafter the second ink is applied to both sides of the respective outermost layer of the first ink, which is applied onto the proton-conductive membrane material, using a second application tool, and wherein chronologically after the application of the second ink the catalyst particle powder is sputtered on both sides of the respective outermost ink layer.

4. The method according to claim 2, wherein the proton-conductive membrane material that has been coated with the first ink is transported to an intermediate drying unit, in which the first ink is partially dried before the second ink is applied so as to form a dry edge film made of the first ink.

5. The method according to claim 1, wherein the catalyst powder is sputtered on the outermost ink layer while the same is still in a moist or wet state.

6. The method according to claim 1, wherein a layer thickness measurement of the layer of the first ink is carried out after the first ink has been applied.

7. The method according to claim 1, wherein a layer thickness measurement of the electrode thickness is carried out after the catalyst powder has been sputtered on, and wherein the first ink and/or the second ink and/or the catalyst powder are applied onto subsequent sections of the proton-conductive membrane material as a function of the measured electrode thickness.

8. The method according to claim 1, wherein the proton-conductive membrane material that has been coated with the at least one ink and sputtered with the catalyst powder is transported to a drying unit, in which the coating is completely dried.

9. The method according to claim 1, wherein a catalyst particle loading of the proton-conductive membrane material, which has been coated with the at least one ink and sputtered with the catalyst powder, is determined by way of X-ray fluorescence analysis, and that the content of supported catalyst particles in the at least one ink is adjusted as a function of the measured catalyst particle loading.

10. The method according to claim 1, wherein the proton-conductive membrane material, which has been coated with the at least one ink and sputtered with the catalyst powder, is cut into individual catalyst-coated membranes.

* * * * *